(12) United States Patent
Lee et al.

(10) Patent No.: US 11,107,374 B2
(45) Date of Patent: Aug. 31, 2021

(54) DISPLAY DEVICE CONFIGURED TO TRANSFORM BETWEEN A CONTRACTED CONFIGURATION AND AN EXPANDED CONFIGURATION

(71) Applicant: Samsung Display Co., Ltd., Yongin-si (KR)

(72) Inventors: Jaesang Lee, Asan-si (KR); Seulgi Kim, Seoul (KR); Kangwoo Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/568,101

(22) Filed: Sep. 11, 2019

(65) Prior Publication Data

US 2020/0135064 A1    Apr. 30, 2020

(30) Foreign Application Priority Data

Oct. 30, 2018  (KR) ........................ 10-2018-0130462

(51) Int. Cl.
*G09F 9/30*   (2006.01)
*G06F 1/16*   (2006.01)

(52) U.S. Cl.
CPC ............ *G09F 9/301* (2013.01); *G06F 1/1601* (2013.01); *G06F 1/1684* (2013.01)

(58) Field of Classification Search
CPC ...... G09F 9/301; G09F 15/0062; G09F 11/02; G09F 2011/0009; G06F 1/1652; G06F 1/1601; G06F 1/1624; G06F 1/1684
See application file for complete search history.

(56) References Cited

U.S. PATENT DOCUMENTS

| | | | |
|---|---|---|---|
| 6,102,355 A * | 8/2000 | Rood | A61H 5/00 |
| | | | 108/147 |
| 7,965,258 B2 | 6/2011 | Aoki | |
| 8,379,377 B2 | 2/2013 | Walters et al. | |
| 8,493,726 B2 | 7/2013 | Visser et al. | |
| D807,844 S | 1/2018 | Kim et al. | |
| 9,911,369 B2 | 3/2018 | Kim et al. | |
| 10,089,920 B2 | 10/2018 | Cho et al. | |

(Continued)

FOREIGN PATENT DOCUMENTS

KR      10-1784880 B1    10/2017
KR   10-2018-0028568 A    3/2018

*Primary Examiner* — James Wu
(74) *Attorney, Agent, or Firm* — Lewis Roca Rothgerber Christie LLP

(57) ABSTRACT

A display device includes a display panel including first and second expansion portions, and a center portion between the first and second expansion portions; a first outer frame connected to the first expansion portion; a second outer frame connected to the second expansion portion; an intermediate frame disposed between the first and second outer frames, and overlapping the center portion of the display panel; a first guide shaft on the intermediate frame; a first motor connected to the first guide shaft; a first slide connected to the first guide shaft and configured to move along the first guide shaft; a first connection portion rotatably connected to one side of the first slide and one end portion of the first outer frame; and a second connection portion rotatably connected to another side of the first slide and one end portion of the second outer frame.

21 Claims, 10 Drawing Sheets

(56) References Cited

U.S. PATENT DOCUMENTS

| | | | |
|---|---|---|---|
| 2015/0116921 A1* | 4/2015 | Hsu | G06F 1/1624 361/679.27 |
| 2016/0353588 A1* | 12/2016 | Kim | G09F 15/0025 |
| 2017/0123536 A1* | 5/2017 | Aurongzeb | G06F 1/1615 |
| 2019/0324501 A1* | 10/2019 | Kim | G09F 9/301 |

* cited by examiner

DISPLAY DEVICE CONFIGURED TO TRANSFORM BETWEEN A CONTRACTED CONFIGURATION AND AN EXPANDED CONFIGURATION

CROSS-REFERENCE TO RELATED APPLICATION

This application claims priority to and the benefit of Korean Patent Application No. 10-2018-0130462, filed on Oct. 30, 2018, in the Korean Intellectual Property Office (KIPO), the disclosure of which is incorporated by reference herein in its entirety.

FIELD

Aspects of embodiments of the present invention relate to a display device, and more particularly, to a display device capable of providing a fixed viewing point regardless of a change in a size of a screen.

DISCUSSION OF RELATED ART

In recent years, as users put a high value on design aspects in purchasing electronic devices, and demand electronic devices capable of providing images of a large size, rollable display devices are attracting greater attention as a display device for electronic devices. Such rollable display devices may display images of different sizes depending on how much a rollable display panel of the rollable display device is unrolled, which affects an area of a display surface of the rollable display panel on which the image is displayed.

It is to be understood that this background of the technology section is intended to provide useful background for understanding the technology and as such disclosed herein, the technology background section may include ideas, concepts or recognitions that were not portion of what was known or appreciated by those skilled in the pertinent art prior to a corresponding effective filing date of subject matter disclosed herein.

SUMMARY

Embodiments of the present disclosure may be directed to a display device capable of providing a fixed viewing point regardless of a size change of a screen of the display device.

According to an embodiment, a display device includes: a display panel including a first expansion portion, a second expansion portion, and a center portion between the first expansion portion and the second expansion portion; a first outer frame connected to the first expansion portion of the display panel; a second outer frame connected to the second expansion portion of the display panel; an intermediate frame between the first outer frame and the second outer frame, and overlapping the center portion of the display panel; a first guide shaft on the intermediate frame; a first motor connected to the first guide shaft; a first slide connected to the first guide shaft and configured to move along the first guide shaft; a first connection portion rotatably connected to one side of the first slide and one end portion of the first outer frame; and a second connection portion rotatably connected to another side of the first slide and one end portion of the second outer frame.

A screw thread may be at an outer circumferential surface of the first guide shaft.

A screw thread may be at an inner wall of a hole of the first slide surrounding a portion of the outer circumferential surface of the first guide shaft.

The first motor may be on the intermediate frame.

The display device may further include: a first roller at a first housing of the first outer frame, and connected to the first expansion portion of the display panel; and a second roller at a second housing of the second outer frame, and connected to the second expansion portion of the display panel.

The display device may further include a second motor connected to the first roller or a third motor connected to the second roller.

The second motor may be at the first housing of the first outer frame, and the third motor may be at the second housing of the second outer frame.

The intermediate frame may include a base portion and a support portion on the base portion supporting the first guide shaft.

The support portion may have a hole surrounding an end portion of the first guide shaft.

The display device may further include a bearing between an inner wall of the hole and the end portion of the first guide shaft.

The display device may further include: a second guide shaft on the intermediate frame; a fourth motor connected to the second guide shaft; a second slide connected to the second guide shaft and configured to move along the second guide shaft; a third connection portion rotatably connected to one side of the second slide and another end portion of the first outer frame; and a fourth connection portion rotatably connected to another side of the second slide and another end portion of the second outer frame.

The first motor and the fourth motor may provide a same rotational force to the first guide shaft and the second guide shaft, respectively.

The first motor and the fourth motor may provide different rotational forces to the first guide shaft and the second guide shaft, respectively.

According to an embodiment, a display device includes: a display panel including a first expansion portion, a second expansion portion, and a center portion between the first expansion portion and the second expansion portion; a first outer frame connected to the first expansion portion of the display panel; a second outer frame connected to the second expansion portion of the display panel; an intermediate frame between the first outer frame and the second outer frame, and overlapping the center portion of the display panel; a first guide shaft and a second guide shaft on the intermediate frame; a first motor connected to the first guide shaft and the second guide shaft through at least one gear; a first slide connected to the first guide shaft and configured to move along the first guide shaft; a second slide connected to the second guide shaft and configured to move along the second guide shaft; a first connection portion rotatably connected to one side of the first slide and one end portion of the first outer frame; a second connection portion rotatably connected to another side of the first slide and one end portion of the second outer frame; a third connection portion rotatably connected to one side of the second slide and another end portion of the first outer frame; and a fourth connection portion rotatably connected to another side of the second slide and another end portion of the second outer frame.

The gear may include a first gear connected to the first motor; and a second gear meshed with the first gear and axially coupled to the first guide shaft and the second guide shaft.

A first screw thread may be at an outer circumferential surface of the first guide shaft and a second screw thread may be at an outer circumferential surface of the second guide shaft.

A third screw thread may be at an inner wall of a hole of the first slide surrounding a portion of the outer circumferential surface of the first guide shaft, and a fourth screw thread may be at an inner wall of a hole of the second slide surrounding a portion of the outer circumferential surface of the second guide shaft.

The first motor and the at least one gear may be on the intermediate frame.

The display device may further include a first roller at a first housing of the first outer frame, and connected to the first expansion portion of the display panel, and a second roller at a second housing of the second outer frame, and connected to the second expansion portion of the display panel.

The display device may further include a second motor connected to the first roller or a third motor connected to the second roller.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation according to an embodiment will become more apparent by describing in detail embodiments thereof with reference to the accompanying drawings, wherein.

DETAILED DESCRIPTION

Figure 1:
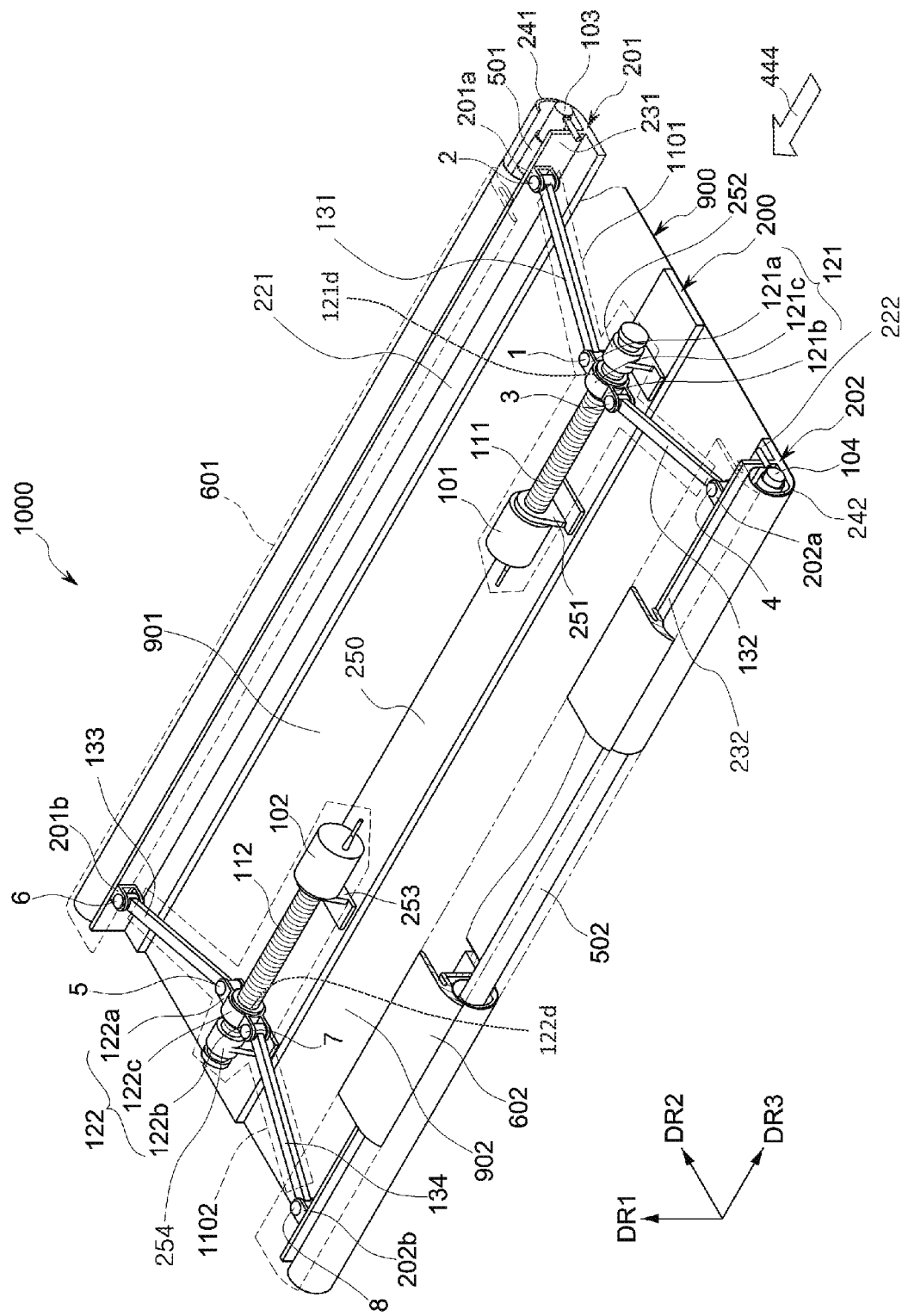
FIG. 1 is a perspective view illustrating a display device according to an embodiment.

Embodiments will now be described more fully hereinafter with reference to the accompanying drawings. Although the invention may be modified in various manners and have several embodiments, embodiments are illustrated in the accompanying drawings and will be mainly described in the specification. However, the scope according to an embodiment is not limited to the embodiments and should be construed as including all the changes, equivalents and substitutions included in the spirit and scope according to an embodiment.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" and the like, may be used herein for ease of description to describe the relations between one element or element and another element or element as illustrated in the drawings. It will be understood that the spatially relative terms are intended to encompass different orientations of the device in use or operation, in addition to the orientation illustrated in the drawings. For example, in a case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or elements, but do not preclude the presence or addition of one or more other features, integers, steps, operations, elements, elements, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within $\pm 30\%$, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined at the present specification.

Some of the parts which are not associated with the description may not be provided in order to specifically describe embodiments according to an embodiment and like reference numerals refer to like elements throughout the specification.

Hereinafter, a display device 1000 according to an embodiment will be described with reference to FIGS. 1 to 10.

Figure 2:
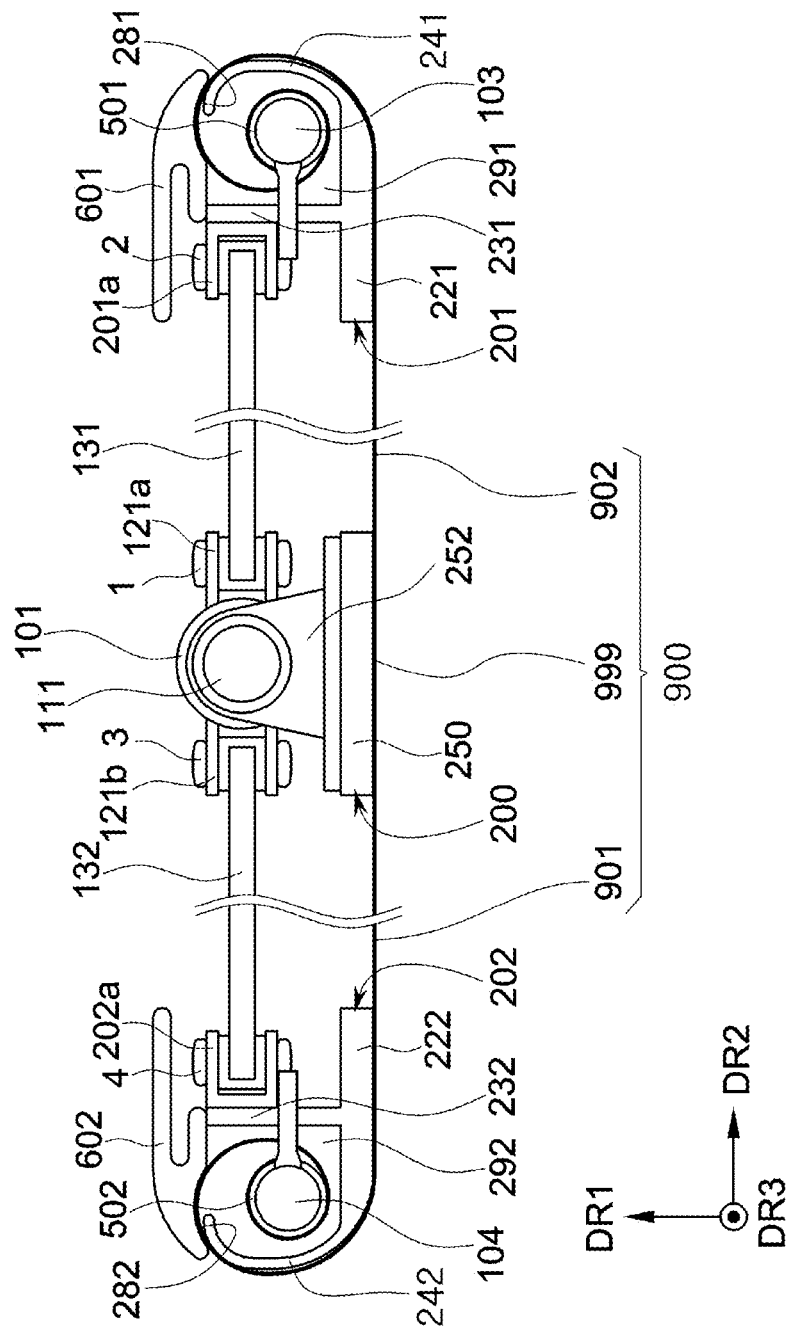
FIG. 2 is a view illustrating the display device of FIG. 1 viewed in a direction of an arrow in FIG. 1.
Figure 3:
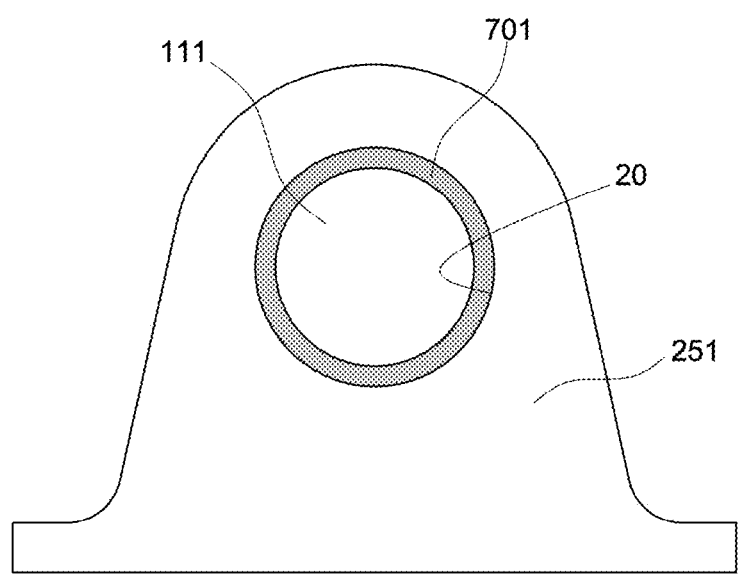
FIG. 3 is a cross-sectional view illustrating a first support portion of of the display device in FIG. 1.

FIG. 1 is a perspective view illustrating a display device 1000 according to an embodiment, FIG. 2 is a view illustrating the display device 1000 of FIG. 1 viewed in a direction of an arrow 444 in FIG. 1, and FIG. 3 is a cross-sectional view illustrating a first support portion 251 of FIG. 1. Herein, FIG. 1 shows a rear surface of the display device 1000 according to an embodiment.

As illustrated in FIGS. 1 and 2, the display device 1000 according to an embodiment includes a display panel 900, an intermediate frame 200, a first outer frame 201, a second outer frame 202, a first roller 501, a second roller 502, a first cover 601, a second cover 602, a third motor 103, a fourth motor 104, a first driver 1101, and a second driver 1102.

The first driver 1101 may include a first motor 101, a first guide shaft 111, a first slide 121, a first connection portion 131, and a second connection portion 132.

The second driver 1102 may include a second motor 102, a second guide shaft 112, a second slide 122, a third connection portion 133, and a fourth connection portion 134.

The intermediate frame 200 may include a base portion 250, a first support portion 251, a second support portion 252, a third support portion 253, and a fourth support portion 254.

The first outer frame 201 may include a first base portion 221, a first inner protruding portion 231, a first outer protruding portion 241, a first opposing coupling portion 201a, and a second opposing coupling portion 201b.

The second outer frame 202 may include a second base portion 222, a second inner protruding portion 232, a second outer protruding portion 242, a third opposing coupling portion 202a and a fourth opposing coupling portion 202b.

Hereinafter, each of the above-described elements will be described in more detail.

The display panel 900 is a flexible display panel 900 or a rollable display panel 900 that may be bent or rolled.

Although not illustrated, the display panel 900 includes a plurality of display elements for displaying images. The display panel 900 includes a first substrate, a second substrate disposed facing the first substrate, and a display element between the first substrate and the second substrate. In addition, the display panel 900 includes at least one gate line, at least one data line, and at least one pixel electrode on the first substrate. The display element may include a liquid crystal layer or a light emitting diode (for example, an organic light emitting diode ("OLED")).

As used herein, a surface of the display panel 900 on which images are displayed may be defined as a front surface of the display panel 900, and another surface of the display panel 900 that faces the front surface of the display panel 900 may be defined as a rear surface of the display panel 900. In such an embodiment, the front surface of the display panel 900 may be a surface that is adjacent to the second substrate and faces the second substrate, and the rear surface of the display panel 900 may be a surface that is adjacent to the first substrate and faces the first substrate. The surface of the display panel 900 illustrated in FIG. 1 is the rear surface of the display panel 900.

A portion of the display panel 900 that overlaps the intermediate frame 200 (for example, the base portion 250 of the intermediate frame 200) may be defined as a center portion 999 of the display panel 900, a portion between the center portion 999 of the display panel 900 and one edge of the display panel 900 may be defined as a first expansion portion 901 of the display panel 900, and a portion between the center portion 999 of the display panel 900 and another edge of the display panel 900 may be defined as a second expansion portion 902 of the display panel 900. In such an embodiment, one edge and another edge of the display panel 900 described above are edges facing each other in a second direction DR2, and one edge of the display panel 900 means an edge of the display panel 900 that overlaps the first outer frame 201, and another edge of the display panel 900 means an edge of the display panel 900 that overlaps the second outer frame 202.

The intermediate frame 200, the first outer frame 201, and the second outer frame 202 are disposed on the display panel 900. For example, the intermediate frame 200, the first outer frame 201, and the second outer frame 202 are disposed on the rear surface of the display panel 900.

The first outer frame 201, the intermediate frame 200 and the second outer frame 202 are sequentially disposed in a direction opposite to the second direction DR2 (hereinafter, "a second reverse direction"). The first outer frame 201, the intermediate frame 200, and the second outer frame 202 are disposed parallel to each other.

The intermediate frame 200 is disposed between the first outer frame 201 and the second outer frame 202. The intermediate frame 200 may have a bar shape extending along a third direction DR3 crossing the second direction DR2 (e.g., perpendicular to the second direction DR2). As used herein, one of the surfaces of the intermediate frame 200 (or the base portion 250) that faces the rear surface of the display panel 900 is defined as a front surface of the intermediate frame 200 (or the base portion 250), another of the surfaces of the intermediate frame 200 (or the base portion 250) that faces the front surface of the intermediate frame 200 (or the base portion 250) is defined as a rear surface of the intermediate frame 200 (or the base portion 250), two of edges of the intermediate frame 200 (or the base portion 250) that face each other in the third direction DR3 are defined as a first end and a second end of the intermediate frame 200 (or the base portion 250), respectively, and a center between the first end and the second end is defined as a center of the intermediate frame 200 (or the base portion 250). In such an embodiment, the first end of the intermediate frame 200 (or the base portion 250) is a portion corresponding to a tip of an arrow indicating the third direction DR3 and the second end of the intermediate frame 200 (or the base portion 250) is a portion corresponding to a tail of the arrow indicating the third direction DR3.

The first motor 101 is disposed on the intermediate frame 200. In an embodiment, the first motor 101 is disposed on the rear surface of the base portion 250 included in the intermediate frame 200. On the rear surface of the base portion 250, the first motor 101 is disposed between the center of the base portion 250 and first end of the base portion 250.

The first support portion 251 is disposed on the intermediate frame 200. In an embodiment, the first support portion 251 is disposed on the rear surface of the base portion 250 included in the intermediate frame 200. In addition, on the rear surface of the base portion 250, the first support portion 251 is disposed between the first motor 101 and the first end of the base portion 250. The first support portion 251 protrudes from the rear surface of the base portion 250 in a first direction DR1. In the illustrated embodiment, the first direction is orthogonal to both the second direction DR2 and the third direction DR3. The first support portion 251 may be secured to the rear surface of the base portion 250. The first support portion 251 may be integrally formed with the base portion 250 into a unitary structure. The first support portion 251 has a hole (20 in FIG. 3).

As illustrated in FIG. 3, a first bearing 701 may be disposed in the hole 20 of the first support portion 251. The first bearing 701 is disposed between an inner wall of the hole 20 of the first support portion 251 and the first guide shaft 111. In an embodiment, the first bearing 701 may be disposed between the inner wall of the hole 20 of the first support portion 251 and an outer circumferential surface of one end portion of the first guide shaft 111. In such an embodiment, no screw thread is disposed on the outer circumferential surface of one end portion of the first guide shaft 111. In other words, no screw thread is disposed on the outer circumferential surface of the first guide shaft 111 that faces (or contacts) the first bearing 701. In an embodiment, the first bearing 701 may be, for example, a ball bearing. However, the first bearing 701 may include bearings of various structures other than a ball bearing.

The second support portion 252 is disposed on the intermediate frame 200. In an embodiment, the second support portion 252 is disposed on the rear surface of the base portion 250 included in the intermediate frame 200. In addition, on the rear surface of the base portion 250, the second support portion 252 is disposed between the first support portion 251 and the first end of the base portion 250. The second support portion 252 protrudes from the rear surface of the base portion 250 in the first direction DR1. The second support portion 252 may be secured to the rear surface of the base portion 250. The second support portion 252 may be integrally formed with the base portion 250 into a unitary structure. The second support portion 252 has a hole. The second support portion 252 faces the first support portion 251 in the third direction DR3. The hole of the second support portion 252 and the hole of the first support portion 251 face each other in the third direction DR3 (e.g., the holes of the second support portion 252 and the first support portion 251 may be aligned along an axis extending in the third direction DR3). The second support portion 252 may have a shape substantially the same as a shape of the first support portion 251. In such an embodiment, the second support portion 252 and the first support portion 251 may have shapes symmetric with respect to an axis in the second direction DR2.

A second bearing (not illustrated) may be disposed in the hole of the second support portion 252. The second bearing is disposed between an inner wall of the hole of the second support portion 252 and the first guide shaft 111. In an embodiment, the second bearing may be disposed between the inner wall of the hole of the second support portion 252 and an outer circumferential surface of another end portion of the first guide shaft 111. In such an embodiment, no screw thread is disposed on the outer circumferential surface of the other end portion of the first guide shaft 111. In other words, no screw thread is disposed on the outer circumferential surface of the first guide shaft 111 that faces (or contacts) the second bearing. The second bearing may be substantially the same as the first bearing 701 described above.

The first guide shaft 111 is disposed on the intermediate frame 200. In an embodiment, the first guide shaft 111 is disposed on the rear surface of the base portion 250 included in the intermediate frame 200. In addition, on the rear surface of the base portion 250, the first guide shaft 111 is disposed between the first support portion 251 and the second support portion 252, and is supported by the first support portion 251 and the second support portion 252. In such an embodiment, the first guide shaft 111 extends in the third direction DR3 and in a direction opposite to the third direction DR3 (hereinafter, "a third reverse direction"), and passes through the hole of the first support portion 251 and the hole of the second support portion 252. One end portion of the first guide shaft 111 passes through the hole 20 of the first support portion 251 and is connected to a drive shaft of the first motor 101, and another end portion of the first guide shaft 111 passes through the hole of the second support portion 252. One end portion of the first guide shaft 111 may have a diameter larger than a diameter of another portion of the first guide shaft 111 such that the end portion of the first guide shaft 111 may serve as a stopper for substantially preventing the first guide shaft 111 from being dislocated from the first support portion 251 and the second support portion 252. The first guide shaft 111 may have a cylindrical shape. A screw thread is disposed at the outer circumferential surface of the first guide shaft 111. The first guide shaft 111 may rotate clockwise or counterclockwise by a rotational force provided from the first motor 101.

The first slide 121 is disposed on the intermediate frame 200. In an embodiment, the first slide 121 is disposed on the rear surface of the base portion 250 included in the intermediate frame 200. In addition, on the rear surface of the base portion 250, the first slide 121 is disposed between the first support portion 251 and the second support portion 252.

The first slide 121 includes a first body portion 121c having a hole, a first coupling portion 121a disposed on one portion of the outer circumferential surface of the first body portion 121c, and a second coupling portion 121b disposed on another portion of the outer circumferential surface of the first body portion 121c facing the first coupling portion 121a. The first coupling portion 121a may be integrally formed with the first body portion 121c into a unitary structure, and the second coupling portion 121b may be integrally formed with the first body portion 121c into a unitary structure. The hole of the first body portion 121c is penetrated by the first guide shaft 111. On an inner wall of the hole of the first body portion 121c, a screw thread 121d that is to be engaged with the screw thread of the first guide shaft 111 described above is disposed. The first slide 121 may move along the first guide shaft 111 between the first support portion 251 and the second support portion 252. In an embodiment, the first slide 121 linearly moves by a rotational movement of the first guide shaft 111. For example, when the first guide shaft 111 rotates in the clockwise direction, the first slide 121 may move from the first support portion 251 toward the second support portion 252 along the first guide shaft 111. On the other hand, when the first guide shaft 111 rotates in the counterclockwise direction, the first slide 121 may move along the first guide shaft 111 from the second support portion 252 toward the first support portion 251. In other words, when the first guide shaft 111 rotates in the clockwise direction, the first slide 121 may move along the first guide shaft 111 along the third reverse direction, and when the first guide shaft 111 moves in the counterclockwise direction, the first slide 121 may move along the first guide shaft 111 along the third direction DR3. In an embodiment, the direction of movement of the first slide 121 in response to the rotation of the first guide shaft 111 may vary according to shapes of the screw threads of the first guide shaft 111 and the first slide 121 (e.g., a rotation direction of the screw thread, such as right-handed or left-handed screw thread).

The first coupling portion 121a of the first slide 121 includes coupling plates that face each other. Each of the coupling plates of the first coupling portion 121a has a hole, and the holes of the coupling plates are located facing each other. Similarly, the second coupling portion 121b of the first slide 121 includes coupling plates that face each other. Each of the coupling plates of the second coupling portion 121b has a hole, and the holes of the coupling plates are located facing each other.

The first outer frame 201 may have a bar shape extending in the third direction DR3. The first base portion 221, the first inner protruding portion 231, the first outer protruding portion 241, the first opposing coupling portion 201a, and the second opposing coupling portion 201b of the first outer frame 201 may be integrally formed into a unitary structure.

The first base portion 221 is disposed on the display panel 900. For example, the first base portion 221 is disposed on the rear surface of the display panel 900. The first base portion 221 may have a bar shape extending in the third direction DR3. As used herein, one of surfaces of the first base portion 221 that faces the rear surface of the display panel 900 is defined as a front surface of the first base portion 221, another of the surfaces of the first base portion 221 that faces the front surface of the first base portion 221 is defined as a rear surface of the base portion 221, and edges of the first base portion 221 that face each other in the third direction DR3 are defined as one end and another end of the first base portion 221, respectively.

The first inner protruding portion 231 protrudes from the rear surface of the first base portion 221 in the first direction DR1. The first inner protruding portion 231 may have a bar shape extending in the third direction DR3.

The first outer protruding portion 241 protrudes from the rear surface of the first base portion 221 in the first direction DR1. The first outer protruding portion 241 protrudes from an edge of the first base portion 221 to face the first inner protruding portion 231. The first outer protruding portion 241 may have a curved cross-section.

The first opposing coupling portion 201a is disposed adjacent to one edge of the first inner protruding portion 231. The first opposing coupling portion 201a protrudes from the first inner protruding portion 231. The first opposing coupling portion 201a includes coupling plates that face each other. Each of the coupling plates of the first opposing coupling portion 201a has a hole, and the holes of the coupling plates are located facing each other.

The second opposing coupling portion 201b is disposed adjacent to another edge of the first inner protruding portion 231. The second opposing coupling portion 201b protrudes from the first inner protruding portion 231. The second opposing coupling portion 201b includes coupling plates that face each other. Each of the coupling plates of the second opposing coupling portion 201b has a hole, and the holes of the coupling plates are located facing each other.

The first cover 601 is disposed on the first outer frame 201. In such an embodiment, a portion of the first cover 601 (hereafter, "a first portion") faces the rear surface of the first base portion 221, another portion of the first cover 601 (hereinafter, "a second portion") contacts the first inner protruding portion 231, and another portion of the first cover 601 (hereinafter, "a third portion") faces the first outer protruding portion 241. In such an embodiment, as illustrated in FIG. 2, a first opening 281 is located between the third portion of the first cover 601 and the first outer protruding portion 241. The first cover 601 and the first outer frame 201 define a first housing that has a first accommodation space 291. For example, a space enclosed by the first cover 601, the first base portion 221, the first inner protruding portion 231, the first outer protruding portion 241, and the first opening 281 corresponds to the first accommodation space 291 of the first housing. In such an embodiment, the first accommodation space 291 communicates with the first opening 281, i.e., is spatially connected to the first opening 281.

The first connection portion 131 may have a bar shape. The first connection portion 131 connects the intermediate frame 200 and the first outer frame 201 to each other. One end portion of the first connection portion 131 is rotatably coupled to the intermediate frame 200, and another end portion of the first connection portion 131 is rotatably coupled to the first outer frame 201. In an embodiment, one end portion of the first connection portion 131 is rotatably connected to the first slide 121 of the first driver 1101 disposed at the intermediate frame 200, and another end portion of the first connection portion 131 is rotatably coupled to the first opposing coupling portion 201a of the first outer frame 201. In such an embodiment, one end portion of the first connection portion 131 is rotatably connected to the first coupling portion 121a of the first slide 121. Accordingly, when the first slide 121 moves linearly along the third direction DR3, the first outer frame 201 moves linearly along the second direction DR2 that is perpendicular to the third direction DR3. In addition, when the first slide 121 moves linearly along the third reverse direction, the first outer frame 201 linearly moves along the second reverse direction.

One end portion of the first connection portion 131 may have a cylindrical shape having a hole at a center portion of the end portion of the first connection portion 131. One end portion of the first connection portion 131 is disposed between the coupling plates of the first coupling portion 121a included in the first slide 121. The hole at one end portion of the first connection portion 131 faces the holes of the coupling plates. A first securing pin 1 is inserted into the hole at one end portion of the first connection portion 131 and the holes of the coupling plates of the first coupling portion 121a.

Another end portion of the first connection portion 131 may have a cylindrical shape having a hole at a center portion of this other end portion of the first connection portion 131. This other end portion of the first connection portion 131 is disposed between the coupling plates of the first opposing coupling portion 201a included in the first outer frame 201. The hole at this other end portion of the first connection portion 131 faces the holes of the coupling plates. A second securing pin 2 is inserted into the hole at the other end portion of the first connection portion 131 and the holes of the coupling plates of the opposing coupling portion 121a.

The second outer frame 202 may have a bar shape extending in the third direction DR3. The second base portion 222, the second inner protruding portion 232, the second outer protruding portion 242, the third opposing coupling portion 202a, and the fourth opposing coupling portion 202b of the second outer frame 202 may be integrally formed into a unitary structure.

The second base portion 222 is disposed on the display panel 900. For example, the second base portion 222 is disposed on the rear surface of the display panel 900. The second base portion 222 may have a bar shape extending in the third direction DR3. As used herein, one of the surfaces of the second base portion 222 that faces the rear surface of the display panel 900 is defined as a front surface of the second base portion 222, another of the surfaces of the second base portion 222 that faces the front surface of the second base portion 222 is defined as a rear surface of the base portion 222, and two of edges of the second base portion 222 that face each other in the third direction DR3 are defined as a first end and a second end of the second base portion 222, respectively.

The second inner protruding portion 232 protrudes from the rear surface of the second base portion 222 in the first direction DR1. The second inner protruding portion 232 may have a bar shape extending in the third direction DR3.

The second outer protruding portion 242 protrudes from the rear surface of the second base portion 222 in the first direction DR1. The second outer protruding portion is disposed at an edge of the second base portion 222 to face the second inner protruding portion 232. The second outer protruding portion 242 may have a curved cross-section.

The third opposing coupling portion 202a is disposed adjacent to one edge of the second inner protruding portion 232. The third opposing coupling portion 202a protrudes from the second inner protruding portion 232. The third opposing coupling portion 202a includes coupling plates that face each other. Each of the coupling plates of the third opposing coupling portion 202a has a hole, and the holes of the coupling plates are located facing each other.

The fourth opposing coupling portion 202b is disposed adjacent to another edge of the second inner protruding portion 232. The fourth opposing coupling portion 202b includes coupling plates that face each other. Each of the coupling plates of the fourth opposing coupling portion 202b has a hole, and the holes of the coupling plates are located facing each other.

The second cover 602 is disposed on the second outer frame 202. In such an embodiment, a portion of the second cover 602 (hereafter, "a fourth portion") faces the rear surface of the second base portion 222, another portion of the second cover 602 (hereinafter, "a fifth portion") contacts the second inner protruding portion 232, and another portion of the second cover 602 (hereinafter, "a sixth portion") faces the second outer protruding portion 242. In such an embodiment, a second opening 282 is located between the sixth portion of the second cover 602 and the second outer protruding portion 242. The second cover 602 and the second outer frame 202 define a second housing that has a second accommodation space 292. For example, a space enclosed by the second cover 602, the second base portion 222, the second inner protruding portion 232, the second outer protruding portion 242, and the second opening 282 corresponds to the second accommodation space 292 of the second housing. In such an embodiment, the second accommodation space 292 communicates with the second opening 282, i.e., is spatially connected to the second opening 282.

The second connection portion 132 may have a bar shape. The second connection portion 132 connects the intermediate frame 200 and the second outer frame 202 to each other. One end portion of the second connection portion 132 is rotatably coupled to the intermediate frame 200, and another end portion of the second connection portion 132 is rotatably coupled to the second outer frame 202. In an embodiment, one end portion of the second connection portion 132 is rotatably connected to the first slide 121 of the first driver 1101 included in the intermediate frame 200, and another end portion of the second connection portion 132 is rotatably coupled to the third opposing coupling portion 202a of the second outer frame 202. In such an embodiment, one end portion of the second connection portion 132 is rotatably connected to the second coupling portion 121b of the first slide 121. Accordingly, when the first slide 121 moves linearly along the third direction DR3, the second outer frame 202 moves linearly along the second reverse direction that is perpendicular to the third direction DR3. In addition, when the first slide 121 moves linearly along the third reverse direction, the second outer frame 202 moves linearly along the second direction DR2.

One end portion of the second connection portion 132 may have a cylindrical shape having a hole at a center portion of the one end portion of the second connection portion 132. One end portion of the second connection portion 132 is disposed between the coupling plates of the second coupling portion 121a included in the first slide 121. The hole at one end portion of the second connection portion 132 faces the holes of the coupling plates. A third securing pin 3 is inserted into the hole at one end portion of the second connection portion 132 and the holes of the coupling plates of the second coupling portion 121a.

Another end portion of the second connection portion 132 may have a cylindrical shape having a hole at a center portion of this other end portion of the second connection portion 132. This other end portion of the second connection portion 132 is disposed between the coupling plates of the third opposing coupling portion 202a included in the second outer frame 202. The hole at this other end portion of the second connection portion 132 faces the holes of the coupling plates. A fourth securing pin 4 is inserted into the hole at another end portion of the second connection portion 132 and the holes of the coupling plates of the opposing coupling portion 202a.

The third motor 103 is disposed between the first outer frame 201 and the first cover 601. In an embodiment, the third motor 103 may be disposed in the first accommodation space 291 of the first housing that is defined by the first outer frame 201 and the first cover 601 described above. In such an embodiment, the third motor 103 is disposed at one end portion of the first base portion 221 in the first accommodation space 291.

The first roller 501 is disposed in the first accommodation space 291. In the first accommodation space 291, the first roller 501 is disposed between the second end of the first base portion 221 and the third motor 103. The first roller 501 may have a cylindrical shape extending along the third direction DR3. The first roller 501 is coupled to a drive shaft of the third motor 103. The first roller 501 may rotate by a rotational force from the third motor 103. For example, the first roller 501 may rotate clockwise or counterclockwise according to a rotation direction of the third motor 103.

One edge of the display panel 900 is connected to the first roller 501. For example, one edge of the display panel 900 may be secured to an outer circumferential surface of the first roller 501. The display panel 900 may be rolled on the outer circumferential surface of the first roller 501 or unrolled from the first roller 501 in accordance with the rotation direction of the first roller 501. For example, the first expansion portion 901 of the display panel 900 may be rolled around the first roller 501 or unrolled from the first roller 501. The first expansion portion 901 of the display panel 900 may be moved in or out through the first opening 281 of the first housing.

The fourth motor 104 is disposed between the second outer frame 202 and the second cover 602. In an embodiment, the fourth motor 104 may be disposed in the second accommodation space 292 of the second housing that is defined by the second outer frame 202 and the second cover 602 described above. In such an embodiment, the fourth motor 104 is disposed at one end portion of the second base portion 222 in the second accommodation space 292.

The second roller 502 is disposed in the second accommodation space 292. In the second accommodation space 292, the second roller 502 is disposed between the second end of the second base portion 222 and the fourth motor 104. The second roller 502 may have a cylindrical shape extending along the third direction DR3. The second roller 502 is coupled to a drive shaft of the fourth motor 104. The second roller 502 may rotate by a rotational force from the fourth motor 104. For example, the second roller 502 may rotate clockwise or counterclockwise according to a rotation direction of the fourth motor 104. The rotation direction of the fourth motor 104 may be different from the rotation direction of the third motor 103.

Another edge of the display panel 900 is connected to the second roller 502. For example, another edge of the display panel 900 may be secured to an outer circumferential surface of the second roller 502. The display panel 900 may be rolled on the outer circumferential surface of the second roller 502 or unrolled from the second roller 502 in accordance with the rotation direction of the second roller 502. For example, the second expansion portion 902 of the display panel 900 may be rolled around the second roller 502 or unrolled from the second roller 502. The second expansion portion 902 of the display panel 900 may be moved in or out through the second opening 282 of the second housing.

The second driver 1102 may have a configuration substantially the same as that of the first driver 1101 described above. For example, the second motor 102, the second guide shaft 112, the second slide 122, the third connection portion 133, and the fourth connection portion 134 of the second driver 1102 may have configurations substantially the same as those of the first motor 101, the first guide shaft 111, the first slide 121, the first connection portion 131, and the second connection portion 132 of the first driver 1101, respectively. However, the above-described elements of the second driver 1102 are disposed symmetrically with each corresponding one of the elements of the first driver 1101. For example, the elements of the second driver 1102 and the elements of the first driver 1101 are disposed symmetrically with respect to an axis in the second direction DR2. As a more specific example, the second motor 102 and the first motor 101 may be disposed symmetrically with respect to the axis in the second direction DR2, the second guide shaft 112 and the first guide shaft 111 may be disposed symmetrically with respect to the axis in the second direction DR2, the second motor 102 and the first motor 101 may be disposed symmetrically with respect to the axis in the second direction DR2, the second slide 122 and the first slide 121 may be disposed symmetrically with respect to the axis in the second direction DR2, the third connection portion 133 and the first connection portion 131 may be disposed symmetrically with respect to the axis in the second direction DR2, the fourth connection portion 134 and the second connection portion 132 may be disposed symmetrically with respect to the axis in the second direction DR2. In addition, the first support portion 251 and the third support portion 253 of the intermediate frame 200 may be disposed symmetrically with respect to the axis in the second direction DR2, and the fourth support portion 254 and the second support portion 252 may be disposed symmetrically with respect to the axis in the second direction DR2.

The second motor 102 is disposed on the intermediate frame 200. In an embodiment, the second motor 102 is disposed on the rear surface of the base portion 250 included in the intermediate frame 200. In addition, on the rear surface of the base portion 250, the second motor 102 is disposed between the center of the base portion 250 and the second end of the base portion 250.

The third support portion 253 is disposed on the intermediate frame 200. In an embodiment, the third support portion 253 is disposed on the rear surface of the base portion 250 included in the intermediate frame 200. In addition, on the rear surface of the base portion 250, the third support portion 253 is disposed between the second motor 102 and the second end of the base portion 250. The third support portion 253 protrudes from the rear surface of the base portion 250 in the first direction DR1. The third support portion 253 may be secured to the rear surface of the base portion 250. The third support portion 253 may be integrally formed with the base portion 250 into a unitary structure. The third support portion 253 has a hole.

A third bearing may be disposed in the hole of the third support portion 253. The third bearing is disposed between an inner wall of the hole of the third support portion 253 and the second guide shaft 112. In an embodiment, the third bearing may be disposed between the inner wall of the hole of the third support portion 253 and an outer circumferential surface of one end portion of the second guide shaft 112. In such an embodiment, no screw thread is disposed on the outer circumferential surface of one end portion of the second guide shaft 112. In other words, no screw thread is disposed on the outer circumferential surface of the second guide shaft 112 that faces (or contacts) the third bearing. The third bearing may have a configuration substantially the same as that of the first bearing 701.

The fourth support portion 254 is disposed on the intermediate frame 200. In an embodiment, the fourth support portion 254 is disposed on the rear surface of the base portion 250 included in the intermediate frame 200. In addition, on the rear surface of the base portion 250, the fourth support portion 254 is disposed between the third support portion 253 and the second end of the base portion 250. The fourth support portion 254 protrudes from the rear surface of the base portion 250 in the first direction DR1. The fourth support portion 254 may be secured to the rear surface of the base portion 250. The fourth support portion 254 may be integrally formed with the base portion 250 into a unitary structure. The fourth support portion 254 has a hole. The fourth support portion 254 faces the third support portion 253 in the third direction DR3. The hole of the fourth support portion 254 and the hole of the third support portion 253 face each other in the third direction DR3 (e.g., the holes of the third support portion 253 and the fourth support portion 254 may be aligned along an axis extending in the third direction DR3). The fourth support portion 254 may have a shape substantially the same as a shape of the third support portion 253. In such an embodiment, the fourth support portion 254 and the third support portion 253 may have shapes symmetric with respect to an axis in the second direction DR2.

A fourth bearing (not illustrated) may be disposed in the hole of the fourth support portion 254. The fourth bearing is disposed between an inner wall of the hole of the fourth support portion 254 and the second guide shaft 112. In an embodiment, the fourth bearing may be disposed between the inner wall of the hole of the fourth support portion 254 and an outer circumferential surface of another end portion of the second guide shaft 112. In such an embodiment, no screw thread is disposed on the outer circumferential surface of the other end portion of the second guide shaft 112. In other words, no screw thread is disposed on the outer circumferential surface of the second guide shaft 112 that faces (or contacts) the fourth bearing. The fourth bearing may be substantially the same as the first bearing 701 described above.

The second guide shaft 112 is disposed on the intermediate frame 200. In an embodiment, the second guide shaft 112 is disposed on the rear surface of the base portion 250 included in the intermediate frame 200. In addition, on the rear surface of the base portion 250, the second guide shaft 112 is disposed between the third support portion 253 and the fourth support portion 254, and is supported by the third support portion 253 and the fourth support portion 254. In such an embodiment, the second guide shaft 112 extends in the third direction DR3 and in the third reverse direction, and passes through the hole of the third support portion 253 and the hole of the fourth support portion 254. A first end portion of the second guide shaft 112 passes through the hole of the third support portion 253 and is connected to a drive shaft of the second motor 102, and a second end portion of the second guide shaft 112 passes through the hole of the fourth support portion 254. One end portion of the second guide shaft 112 may have a diameter larger than a diameter of another portion of the second guide shaft 112 such that the end portion of the second guide shaft 112 may serve as a stopper for substantially preventing the second guide shaft 112 from being dislocated from the third support portion 253 and the fourth support portion 254. The second guide shaft 112 may have a cylindrical shape. A screw thread is disposed at the outer circumferential surface of the second guide shaft 112. The second guide shaft 112 may rotate clockwise or counterclockwise by a rotational force provided from the second motor 102.

The second slide 122 is disposed on the intermediate frame 200. In an embodiment, the second slide 122 is disposed on the rear surface of the base portion 250 included in the intermediate frame 200. In addition, on the rear surface, the second slide 122 is disposed between the third support portion 253 and the fourth support portion 254.

The second slide 122 includes a second body portion 122c having a hole, a third coupling portion 122a disposed on one portion of the outer circumferential surface of the second body portion 122c, and a fourth coupling portion 122b disposed on another portion of the outer circumferential surface of the second body portion 122c facing the third coupling portion 122a. The third coupling portion 122a may be integrally formed with the second body portion 122c into a unitary structure, and the fourth coupling portion 122b may be integrally formed with the second body portion 122c into a unitary structure. The hole of the second body portion 122c is penetrated by the second guide shaft 112. On an inner wall of the hole of the second body portion 122c, a screw thread 122d that is to be engaged with the screw thread of the second guide shaft 112 described above is disposed. The second slide 122 may move along the second guide shaft 112 between the third support portion 253 and the fourth support portion 254. In an embodiment, the second slide 122 moves linearly by a rotational movement of the second guide shaft 112. For example, when the second guide shaft 112 rotates in the counterclockwise direction, the second slide 122 may move from the third support portion 253 toward the fourth support portion 254 along the second guide shaft 112. On the other hand, when the second guide shaft 112 rotates in the clockwise direction, the second slide 122 may move along the second guide shaft 112 from the fourth support portion 254 toward the third support portion 253. In other words, when the second guide shaft 112 rotates in the counterclockwise direction, the second slide 122 may move along the second guide shaft 112 along the third reverse direction, and when the second guide shaft 112 rotates in the clockwise direction, the second slide 122 may move along the second guide shaft 112 along the third direction DR3. In an embodiment, the direction of movement of the second slid 122 in response to the rotation of the second guide shaft 112 may vary according to shapes of the screw threads of the second guide shaft 112 and the second slide 122 (e.g., a rotation direction of the screw thread, such as left-hand or right-hand screw thread).

The third coupling portion 122a of the second slide 122 includes coupling plates that face each other. Each of the coupling plates of the third coupling portion 122a has a hole, and the holes of the coupling plates are located facing each other. Similarly, the fourth coupling portion 122b of the second slide 122 includes coupling plates that face each other. Each of the coupling plates of the fourth coupling portion 122b has a hole, and the holes of the coupling plates are located facing each other.

The third connection portion 133 may have a bar shape. The third connection portion 133 connects the intermediate frame 200 and the first outer frame 201 to each other. One end portion of the third connection portion 133 is rotatably coupled to the intermediate frame 200, and another end portion of the third connection portion 133 is rotatably coupled to the first outer frame 201. In an embodiment, one end portion of the third connection portion 133 is rotatably connected to the second slide 122 of the second driver 1102 disposed at the intermediate frame 200, and another end portion of the third connection portion 133 is rotatably coupled to the second opposing coupling portion 201b of the first outer frame 201. In such an embodiment, one end portion of the third connection portion 133 is rotatably connected to the third coupling portion 122a of the second slide 122. Accordingly, when the second slide 122 moves linearly along the third direction DR3, the first outer frame 201 moves linearly along the second reverse direction that is perpendicular to the third direction DR3. In addition, when the second slide 122 moves linearly along the third reverse direction, the first outer frame 201 moves linearly along the second direction DR2.

One end portion of the third connection portion 133 may have a cylindrical shape having a hole at a center portion of the one end portion of the third connection portion 133. This end portion of the third connection portion 133 is disposed between the coupling plates of the third coupling portion 122a included in the second slide 122. The hole at this end portion of the third connection portion 133 faces the holes of the coupling plates. A fifth securing pin 5 is inserted into the hole at this end portion of the third connection portion 133 and the holes of the coupling plates of the third coupling portion 122a.

Another end portion of the third connection portion 133 may have a cylindrical shape having a hole at a center portion of this other portion of the third connection portion 133. This end portion of the third connection portion 133 is disposed between the coupling plates of the second opposing coupling portion 201b included in the first outer frame 201. The hole at this end portion of the third connection portion 133 faces the holes of the coupling plates. A sixth securing pin 6 is inserted into the hole at this other end portion of the third connection portion 133 and the holes of the coupling plates of the second opposing coupling portion 201b.

The fourth connection portion 134 may have a bar shape. The fourth connection portion 134 connects the intermediate frame 200 and the second outer frame 202 to each other. One end portion of the fourth connection portion 134 is rotatably coupled to the intermediate frame 200, and another end portion of the fourth connection portion 134 is rotatably coupled to the second outer frame 202. In an embodiment, one end portion of the fourth connection portion 134 is rotatably connected to the second slide 122 of the second driver 1102 included in the intermediate frame 200, and another end portion of the fourth connection portion 134 is rotatably coupled to the fourth opposing coupling portion 202b of the second outer frame 202. In such an embodiment, one end portion of the fourth connection portion 134 is rotatably connected to the fourth coupling portion 122b of the second slide 122. Accordingly, when the second slide 122 moves linearly along the third direction DR3, the second outer frame 202 moves linearly along the second direction DR2 that is perpendicular to the third direction DR3. In addition, when the second slide 122 moves linearly along the third reverse direction, the second outer frame 202 moves linearly along the second reverse direction.

One end portion of the fourth connection portion 134 may have a cylindrical shape having a hole at a center portion of the one end portion of the fourth connection portion 134. This end portion of the fourth connection portion 134 is disposed between the coupling plates of the fourth coupling portion 122b included in the second slide 122. The hole at this end portion of the fourth connection portion 134 faces the holes of the coupling plates. A seventh securing pin 7 is inserted into the hole at this end portion of the fourth connection portion 134 and the holes of the coupling plates of the fourth coupling portion 122b.

Another end portion of the fourth connection portion 134 may have a cylindrical shape having a hole at a center portion of this other end portion of the fourth connection portion 134. This end portion of the fourth connection portion 134 is disposed between the coupling plates of the fourth opposing coupling portion 202b included in the second outer frame 202. The hole at this end portion of the fourth connection portion 134 faces the holes of the coupling plates. An eighth securing pin 8 is inserted into the hole at this end portion of the fourth connection portion 134 and the holes of the coupling plates of the fourth opposing coupling portion 202b.

The first motor 101 and the second motor 102 may be controlled by the same controller. The first motor 101 and the second motor 102 operate at the same timing (e.g., the first motor 101 and the second motor 102 operate synchronously). For example, the first motor 101 and the second motor 102 are driven at the same point in time, and stop operating at the same point in time. In addition, the first motor 101 provides the same driving force as the second motor 102. For example, the number of rotations of the first motor 101 and the number of rotations of the second motor 102 are substantially the same as each other. However, the first motor 101 operates in reverse to the second motor 102. For example, when the first motor 101 provides a clockwise rotational force, the second motor 102 provides a counterclockwise rotational force.

The third motor 103 is driven synchronously with the first motor 101 and the second motor 102. For example, when the first motor 101 rotates the first guide shaft 111 so that the first slide 121 moves toward the second support portion 252, the third motor 103 rotates the first roller 501 so that the display panel 900 is unrolled. On the other hand, when the first motor 101 rotates the first guide shaft 111 so that the first slide 121 moves toward the second support portion 252, the third motor 103 rotates the first roller 501 so that the display panel 900 is wound further (i.e., rolled up).

Similarly, the fourth motor 104 is driven synchronously with the first motor 101 and the second motor 102. For example, when the first motor 101 rotates the first guide shaft 111 so that the first slide 121 moves toward the second support portion 252, the fourth motor 104 rotates the second roller 502 so that the display panel 900 is unrolled. On the other hand, when the first motor 101 rotates the first guide shaft 111 so that the first slide 121 moves toward the first support portion 251, the fourth motor 104 rotates the second roller 502 so that the display panel 900 is wound further (i.e., rolled up).

The display device 1000 according to an embodiment may be driven in an expansion mode and a contraction mode, and FIG. 1 shows the display device 1000 being driven in the expansion mode.

For example, when the display device is driven in the expansion mode, the first motor 101 provides a driving force in a first rotation direction (e.g., a clockwise direction) to the first guide shaft 111. Then, the first guide shaft 111 rotates in the first rotation direction. As the first guide shaft 111 rotates in the first rotation direction, the first slide 121 engaged with the screw thread of the first guide shaft 111 moves toward the second support portion 252. Accordingly, the first connection portion 131 and the second connection portion 132, which respectively are connected to opposite sides of the first slide 121, push the first outer frame 201 and the second outer frame 202 outwards, respectively, so that the first outer frame 201 and the second outer frame 202 move away from each other. In other words, the first connection portion 131 pushes the first outer frame 201 in the second direction DR2, and the second connection portion 132 pushes the second outer frame 202 in the second reverse direction. In such an embodiment, the third motor 103 provides a rotational force in the first rotation direction to the first roller 501. As the first roller 501 rotates in the first rotation direction, the first expansion portion 901 of the display panel 900 is pulled out from the first roller 501 to the outside of the first accommodation space 291.

At the same time, the second motor 102 provides a driving force in a second rotation direction (e.g., a counterclockwise direction) to the second guide shaft 112. Then, the second guide shaft 112 rotates in the second rotation direction. As the second guide shaft 112 rotates in the second rotation direction, the second slide 122 engaged with the screw thread of the second guide shaft 112 moves toward the fourth support portion 254. Accordingly, the third connection portion 133 and the fourth connection portion 134, which respectively are connected to opposite sides of the second slide 122, push the first outer frame 201 and the second outer frame 202 outwards, respectively, so that the first outer frame 201 and the second outer frame 202 move away from each other. In other words, the third connection portion 133 pushes the first outer frame 201 in the second direction DR2, and the fourth connection portion 134 pushes the second outer frame 202 in the second reverse direction. In such an embodiment, the fourth motor 104 provides a rotational force in the second rotation direction to the second roller 502. As the second roller 502 rotates in the second rotation direction, the second expansion portion 902 of the display panel 900 is pulled out from the second roller 502 to the outside of the second accommodation space 292.

In such a manner, the first expansion portion 901 and the second expansion portion 902 of the display panel 900 are unrolled, and a display surface of the display panel 900 expands.

In another embodiment, the first motor 101 and the second motor 102 may be individually controlled by different controllers. In such an embodiment, the first motor 101 and the second motor 102 may operate at different timings. For example, the first motor 101 and the second motor 102 may be driven at different points in time, and stop at different points in time. In addition, the first motor 101 may provide a driving force different from that of the second motor 102. For example, the number of rotations of the first motor 101 and the number of rotations of the second motor 102 may be different from each other. In such an embodiment, a left edge and a right edge of the display panel 900 may have different lengths. In other words, a left display surface and a right display surface of the display panel 900 may have different areas with respect to an axis in the second direction DR2 crossing the center portion of the display panel 900.

Figure 4:
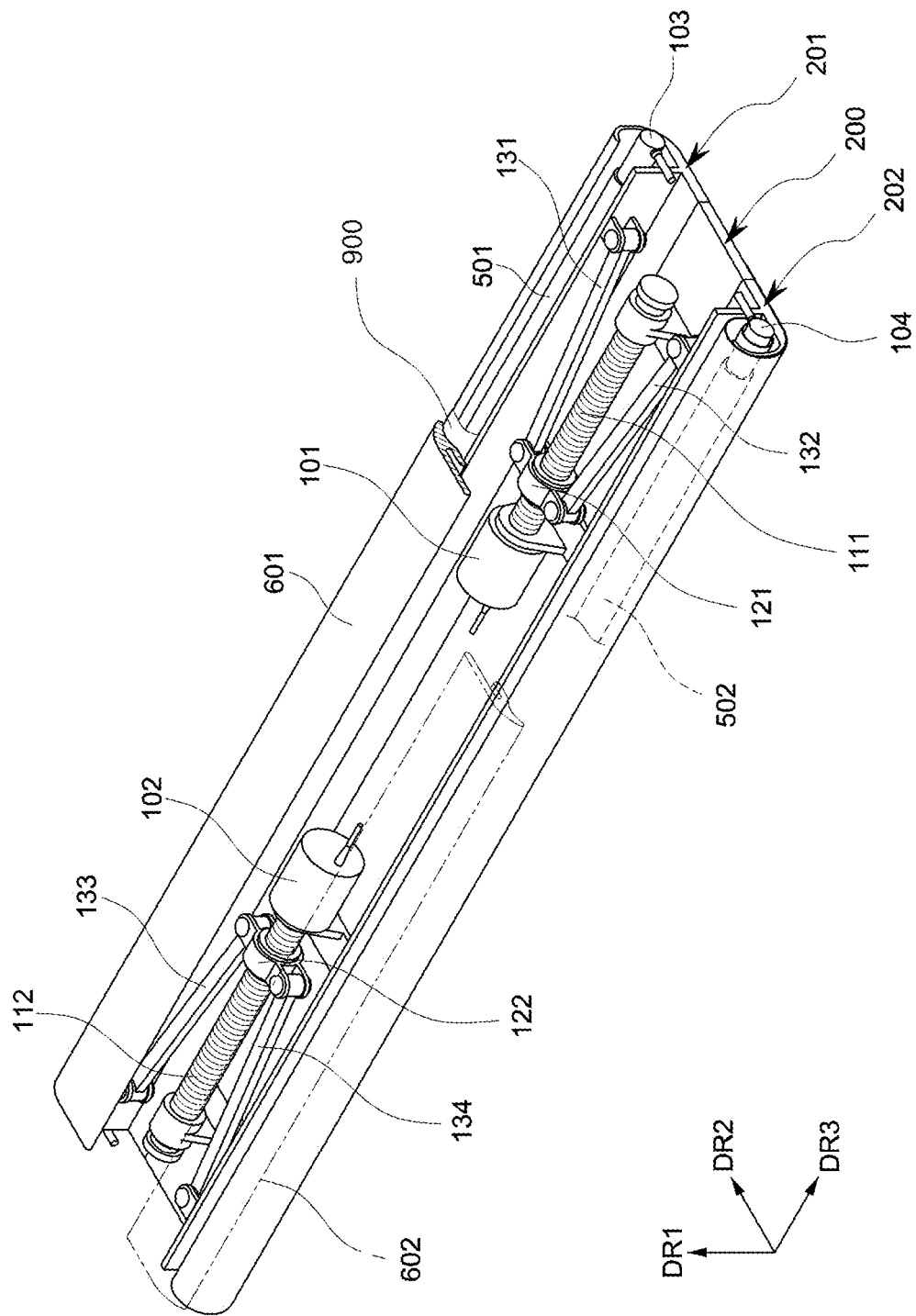
FIG. 4 is a perspective view illustrating the display device of FIG. 1 in a contracted configuration.

FIG. 4 is a perspective view illustrating a state in which the display device 1000 of FIG. 1 is rolled (i.e., in a contracted configuration).

As illustrated in FIG. 4, the display device 1000 may be driven in the contraction mode.

For example, in the contraction mode, the first motor 101 provides a driving force in the second rotation direction (e.g., a counterclockwise direction) to the first guide shaft 111. Then, the first guide shaft 111 rotates in the second rotation direction. As the first guide shaft 111 rotates in the second rotation direction, the first slide 121 engaged with the screw thread of the first guide shaft 111 moves toward the first support portion 251. Accordingly, the first connection portion 131 and the second connection portion 132, which respectively are connected to opposite sides of the first slide 121, pull the first outer frame 201 and the second outer frame 202 inwards, respectively, so that the first outer frame 201 and the second outer frame 202 move closer to each other. In other words, the first connection portion 131 pulls the first outer frame 201 in the second reverse direction, and the second connection portion 132 pulls the second outer frame 202 in the second direction DR2. In such an embodiment, the third motor 103 provides a rotational force in the second rotation direction to the first roller 501. As the first roller 501 rotates in the second rotation direction, the first expansion portion 901 of the display panel 900 is withdrawn into the first accommodation space 291 and is rolled or wound on the outer circumferential surface of the first roller 501.

At the same time, the second motor 102 provides a driving force in the first rotation direction (e.g., a clockwise direction) to the second guide shaft 112. Then, the second guide shaft 112 rotates in the first rotation direction. As the second guide shaft 112 rotates in the first rotation direction, the second slide 122 engaged with the screw thread of the second guide shaft 112 moves toward the third support portion 253. Accordingly, the third connection portion 133 and the fourth connection portion 134, which respectively are connected to opposite sides of the second slide 122, pull the first outer frame 201 and the second outer frame 202 inwards, respectively, so that the first outer frame 201 and the second outer frame 202 move closer to each other. In other words, the third connection portion 133 pulls the first outer frame 201 in the second reverse direction, and the fourth connection portion 134 pulls the second outer frame 202 in the second direction DR2. In such an embodiment, the fourth motor 104 provides a rotational force in the first rotation direction to the second roller 502. As the second roller 502 rotates in the first rotation direction, the second expansion portion 902 of the display panel 900 is withdrawn into the second accommodation space 292 and is rolled or wound on the outer circumferential surface of the second roller 502.

In such a manner, the first expansion portion 901 and the second expansion portion 902 of the display panel 900 are rolled or wound about the first roller 501 and the second roller 502, respectively, and the display surface of the display panel 900 is contracted.

In an embodiment, opposite edges of the display panel 900 may be pulled by the third motor 103 and the fourth motor 104, whereby a tension may be applied to the display panel 900. Accordingly, when the display panel 900 is fully rolled or unrolled, the exposed display surface of the display panel 900 may be smooth without creases. In an alternative embodiment, the third motor 103 and the fourth motor 104 may be omitted.

Figure 5A:
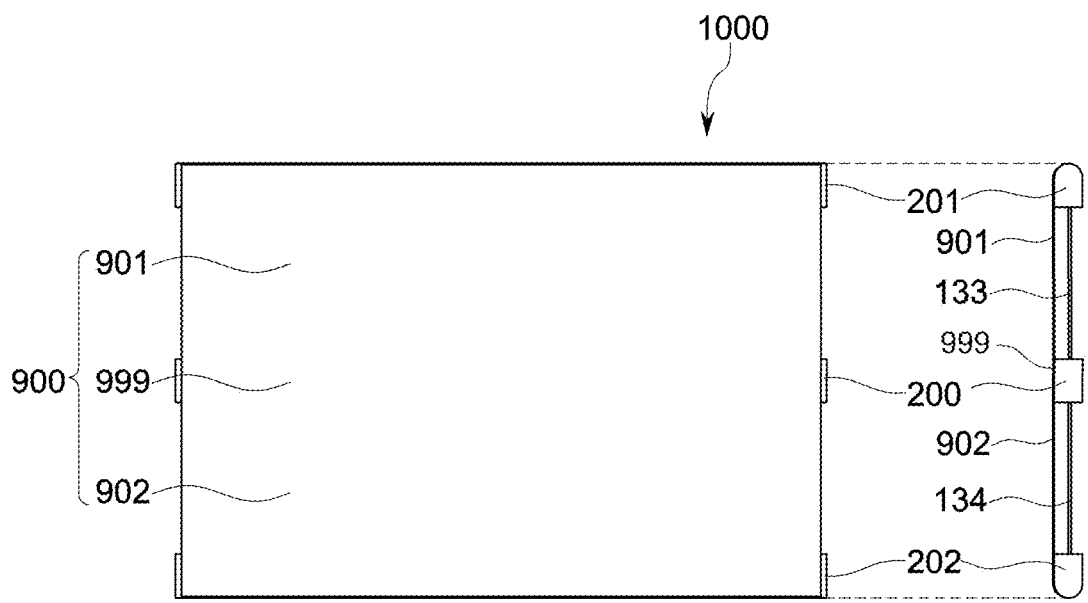
FIGS. 5A and 5B are front, rear and side views illustrating a display device according to an embodiment in an expanded configuration.
Figure 5B:
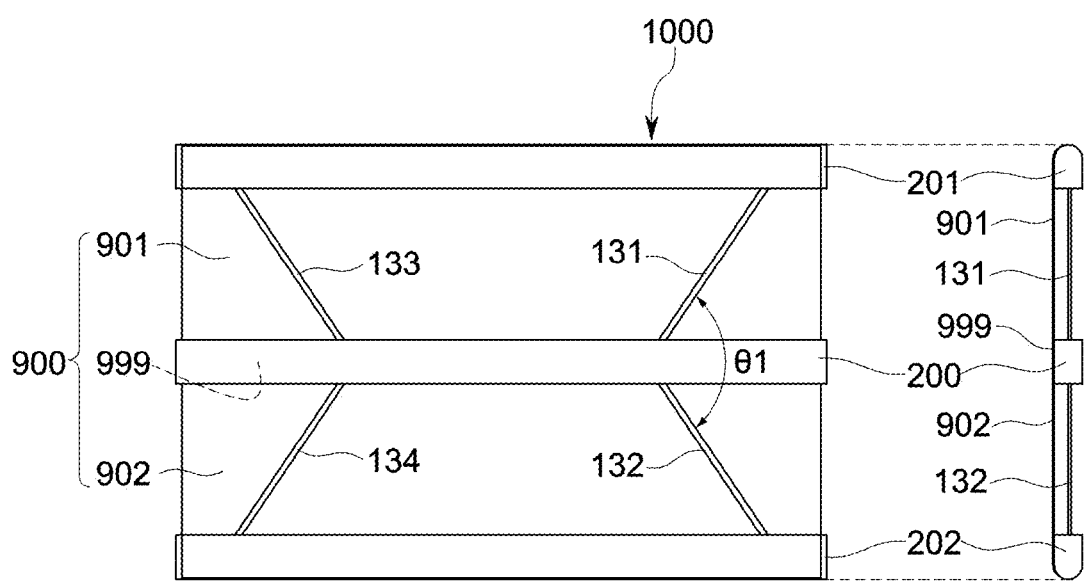

FIGS. 5A and 5B are front, rear and side views illustrating a display device 1000 according to an embodiment in an expanded configuration.

As illustrated in FIG. 5A, the display panel 900 of the display device 1000 in the expanded configuration has the display surface of a relatively large area.

In addition, as illustrated in FIG. 5B, an obtuse angle may be defined between the connection portions 131, 132 and 133, 134 symmetrically disposed with respect to the intermediate frame 200. For example, an angle θ1 (hereinafter, "a first angle") between the first connection portion 131 and the second connection portion 132 may be an obtuse angle. Similarly, an angle (hereinafter, "a second angle") between the third connection portion 133 and the fourth connection portion 134 may be an obtuse angle. In such an embodiment, the first angle θ1 and the second angle may be substantially equal to each other.

Figure 6A:
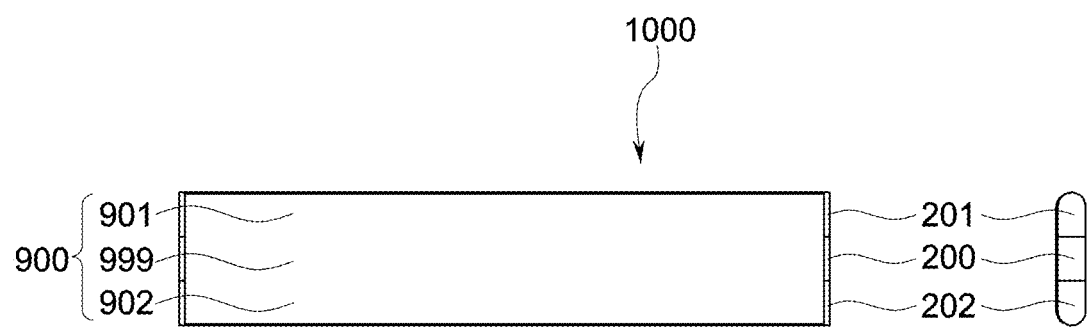
FIGS. 6A and 6B are front, rear and side views illustrating a display device according to an embodiment in contracted configuration.
Figure 6B:
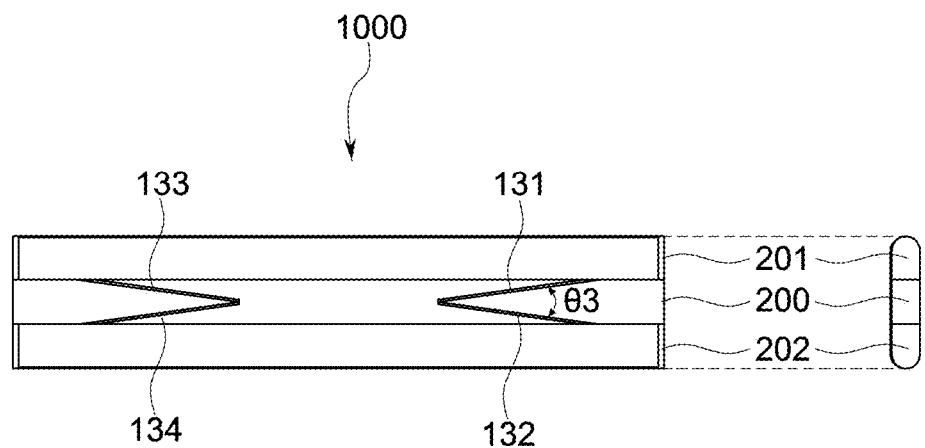

FIGS. 6A and 6B are front, rear and side views illustrating a display device 1000 according to an embodiment in a contracted configuration.

As illustrated in FIG. 6A, the display panel 900 of the display device 1000 in the contracted configuration has the display surface of a relatively small area.

In addition, as illustrated in FIG. 6B, an acute angle may be defined between the connection portions 131, 132 and 133, 134 symmetrically disposed with respect to the intermediate frame 200. For example, an angle θ3 (hereinafter, "a third angle") between the first connection portion 131 and the second connection portion 132 may be an acute angle. Similarly, an angle (hereinafter, "a fourth angle") between the third connection portion 133 and the fourth connection portion 134 may be an acute angle. In such an embodiment, the third angle θ3 and the fourth angle may be substantially equal to each other.

Figure 7A:
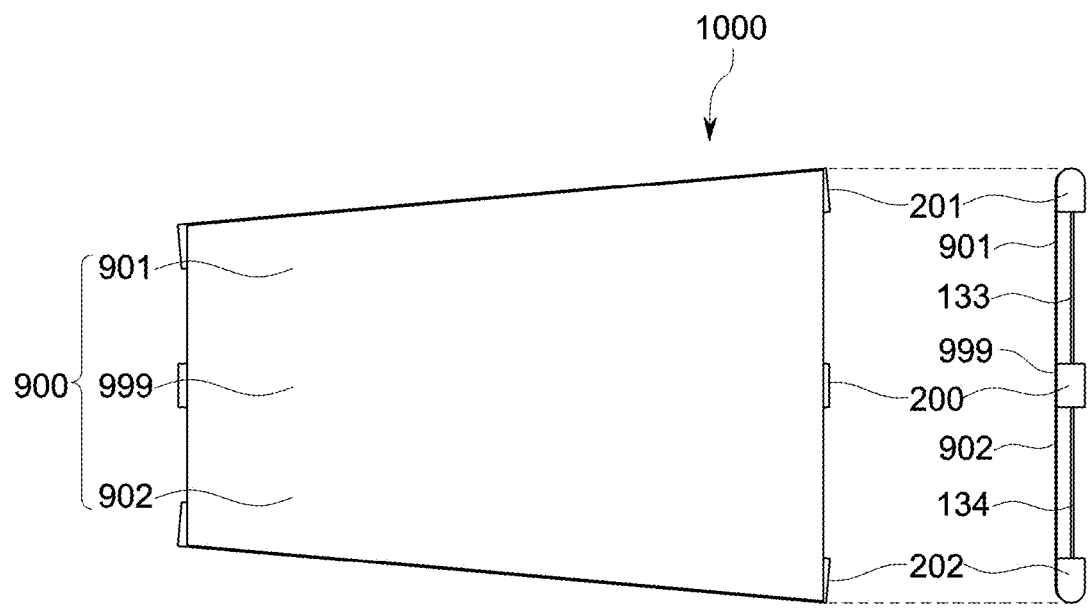
FIGS. 7A and 7B are front, rear and side views illustrating a display device according to an embodiment in an asymmetrical configuration.
Figure 7B:
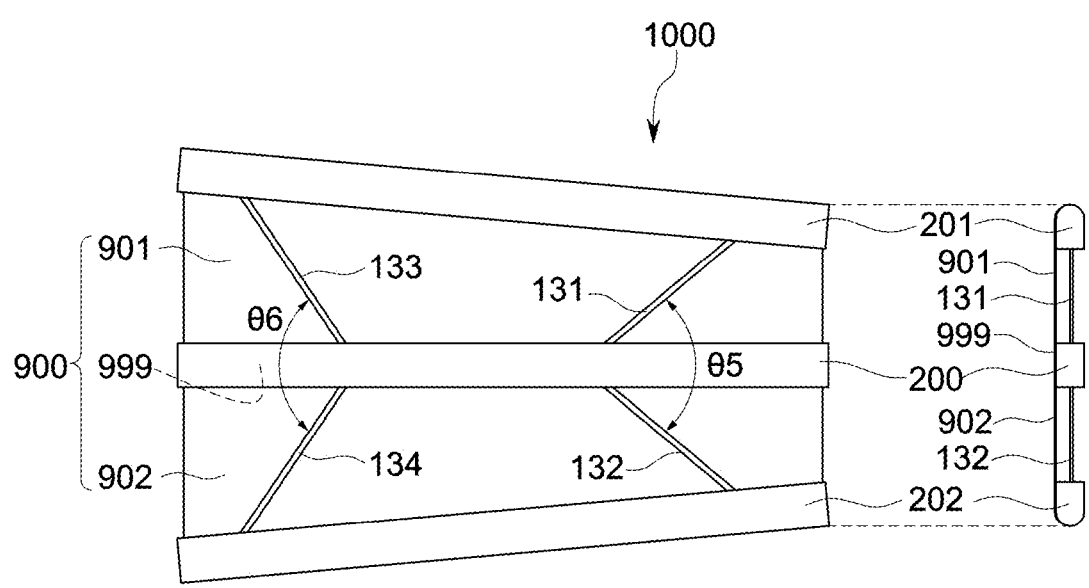

FIGS. 7A and 7B are front, rear and side views illustrating the display device 1000 according to an embodiment in an asymmetrical configuration.

When a left display surface and a right display surface of the display panel 900 have different areas from each other with respect to an axis in the second direction DR2 crossing the center of the display panel 900, an angle θ5 (hereinafter, "a fifth angle") between the first connection portion 131 and the second connection portion 132 may be different from an angle θ6 (hereinafter, "a sixth angle") between the third connection portion 133 and the fourth connection portion 134. For example, the fifth angle θ5 may be less than the sixth angle θ6. As a more specific example, the fifth angle θ5 may be an acute angle, and the sixth angle θ6 may be an obtuse angle.

Figure 8:
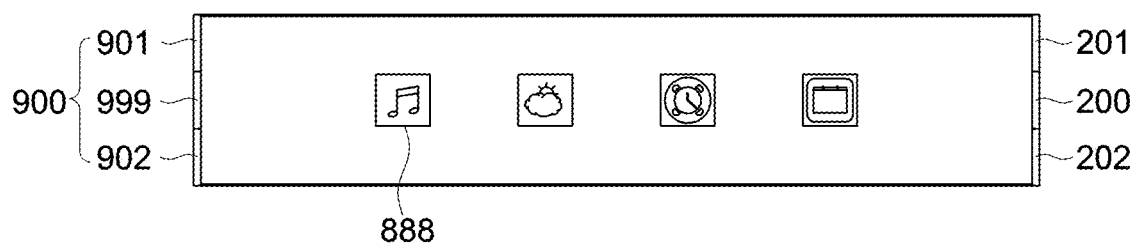
FIG. 8 is a view illustrating a display device according to an embodiment in a contracted configuration.

FIG. 8 is a view illustrating a display device 1000 according to an embodiment in a contracted configuration.

As illustrated in FIG. 8, icons 888 corresponding to, for example, living information, music information, time information, and/or schedule information may be displayed on the display panel 900 of the display device 1000 in the contracted configuration.

Figure 9:
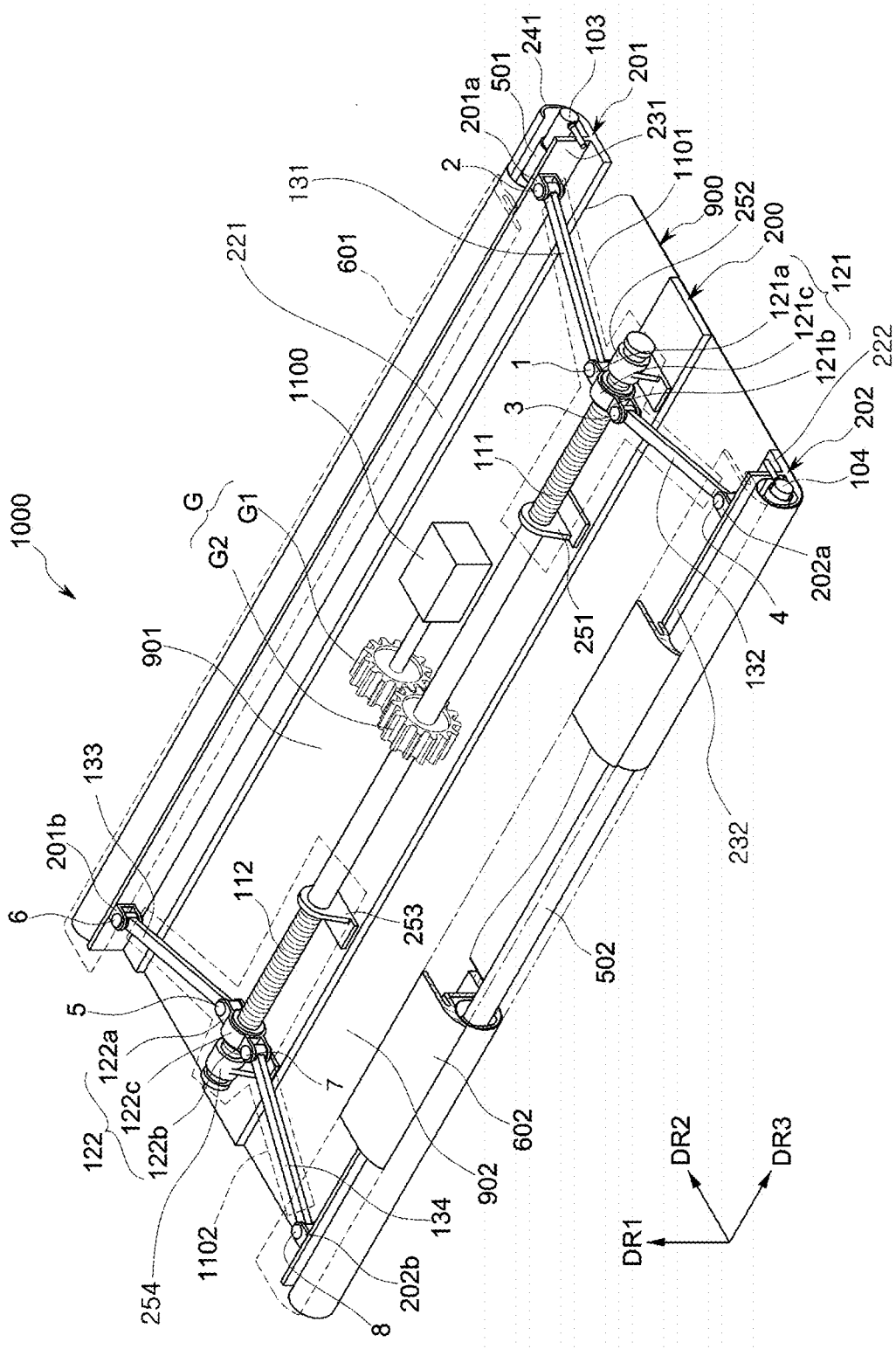
FIG. 9 is a perspective view illustrating a display device according to another embodiment.

FIG. 9 is a perspective view illustrating a display device 1000 according to another embodiment.

As illustrated in FIG. 9, the first driver 1101 and the second driver 1102 may be driven by a single motor 1100. To this end, for example, the motor 1100 may be connected to the first guide shaft 111 and the second guide shaft 112 through a spur gear G. As a specific example, the spur gear G includes a first gear G1 and a second gear G2 connected to (e.g., meshed with) the first gear G1. A rotation axis of the first gear G1 and a rotation axis of the second gear G2 are parallel to each other.

The motor 1100 is connected to a rotation shaft of the first gear G1. A rotational force of the motor 1100 is provided to the first gear G1. The second gear G2 is rotated by the rotation of the first gear G1. For example, when the first gear G1 rotates clockwise, the second gear G2 rotates counter-clockwise.

One end portion of a rotation shaft of the second gear G2 is connected to the first guide shaft 111, and another end portion of the rotation shaft of the second gear G2 is connected to the second guide shaft 112.

As the first guide shaft 111 and the second guide shaft 112 in FIG. 9 are driven by the same single motor 1100, the first guide shaft 111 and the second guide shaft 112 may rotate together with the substantially same rotational force. Accordingly, the first connection portion 131 and the third connection portion 133 may be maintained in a mutually symmetrical state more stably. Similarly, the second connection portion 132 and the fourth connection portion 134 may be maintained in a mutually symmetrical state more stably.

The remaining elements of FIG. 9 are substantially the same as those of FIGS. 1 to 8 described above.

Figure 10:
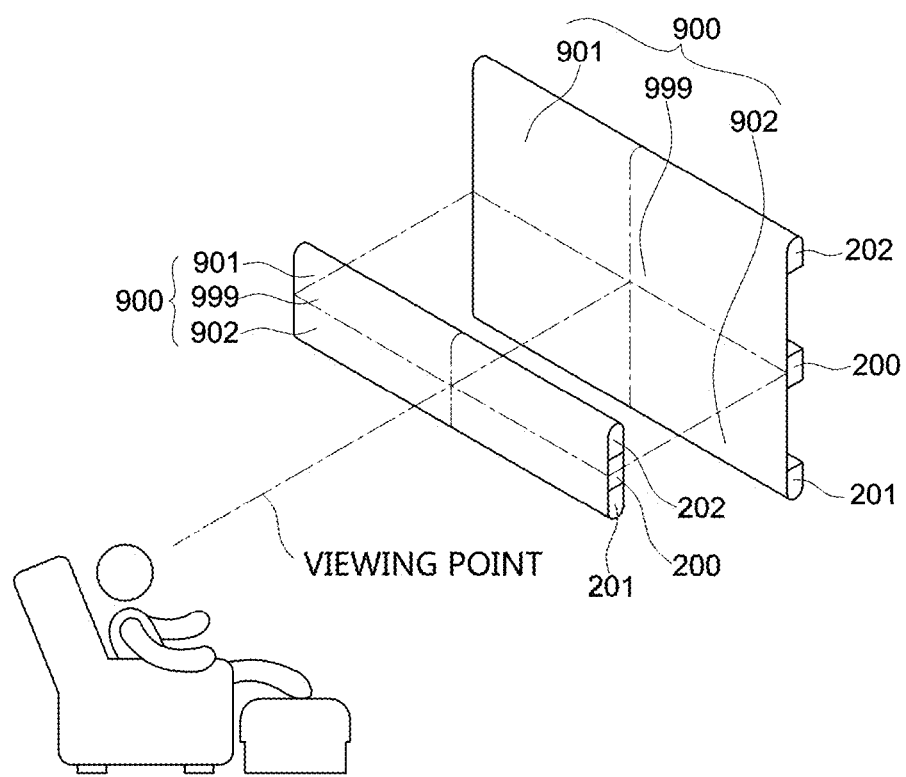
FIG. 10 is an explanatory diagram illustrating the effect of embodiments of the present invention.

FIG. 10 is an explanatory diagram illustrating the effect of embodiments of the present disclosure.

As illustrated in FIG. 10, the first outer frame 201 and the second outer frame 202 of the display device 1000 according to an embodiment move in an up and down direction with respect to the intermediate frame 200. In other words, when the display device 1000 in the contracted configuration is transformed into the display device 1000 in the expanded configuration, or when the display device 1000 in the expanded configuration is transformed into the display device 1000 in the contracted configuration, the intermediate frame 200 is fixed (e.g., stationary). Accordingly, a viewing point of a viewer may be fixed to the center portion of the display panel 900 that overlaps the intermediate frame 200. Accordingly, although the configuration of the display device 1000 is changed (e.g., from the expanded configuration to the contracted configuration, or from the contracted configuration to the expanded configuration), the viewing point may not change and thus the consistency of the viewing point may be maintained. That is, regardless of the configuration of the display device 1000, the viewing point may be fixed (e.g., constant).

As set forth hereinabove, according to one or more embodiments of the present invention, the display device may provide a fixed viewing point regardless of the size change of the screen.

While the present invention has been illustrated and described with reference to the embodiments thereof, it will be apparent to those of ordinary skill in the art that various changes in form and detail may be made thereto without departing from the spirit and scope according to an embodiment.

What is claimed is:

1. A display device comprising:
   a display panel comprising a first expansion portion, a second expansion portion, and a center portion between the first expansion portion and the second expansion portion;
   a first outer frame connected to the first expansion portion of the display panel, wherein the first expansion portion of the display panel wraps around at least a portion of an outer side portion of the first outer frame;
   a second outer frame connected to the second expansion portion of the display panel, wherein the second expansion portion of the display panel wraps around at least a portion of an outer side portion of the second outer frame;
   an intermediate frame between the first outer frame and the second outer frame, and overlapping the center portion of the display panel;
   a first guide shaft on the intermediate frame;
   a first motor connected to the first guide shaft;
   a first slide connected to the first guide shaft and configured to move along the first guide shaft;
   a first connection portion rotatably connected to one side of the first slide and one end portion of the first outer frame; and
   a second connection portion rotatably connected to another side of the first slide and one end portion of the second outer frame,
   wherein the first connection portion is connected only to the first slide and the first outer frame.

2. The display device of claim 1, further comprising a first screw thread at an outer circumferential surface of the first guide shaft.

3. The display device of claim 2, further comprising a second screw thread at an inner wall of a hole of the first slide surrounding a portion of the outer circumferential surface of the first guide shaft.

4. The display device of claim 1, wherein the first motor is on the intermediate frame.

5. The display device of claim 1, further comprising:
   a first roller at a first housing defined in part by the first outer frame, and connected to the first expansion portion of the display panel; and
   a second roller at a second housing defined in part by the second outer frame, and connected to the second expansion portion of the display panel.

6. The display device of claim 5, further comprising at least one of a second motor connected to the first roller, or a third motor connected to the second roller.

7. The display device of claim 6, wherein the second motor is at the first housing, and the third motor is at the second housing.

8. The display device of claim 1, wherein the intermediate frame comprises:
   a base portion; and
   a support portion on the base portion and supporting the first guide shaft.

9. The display device of claim 8, wherein the support portion has a hole surrounding an end portion of the first guide shaft.

10. The display device of claim 9, further comprising a bearing between an inner wall of the hole and the end portion of the first guide shaft.

11. The display device of claim 1, further comprising:
a second guide shaft on the intermediate frame;
a fourth motor connected to the second guide shaft;
a second slide connected to the second guide shaft and configured to move along the second guide shaft;
a third connection portion rotatably connected to one side of the second slide and another end portion of the first outer frame; and
a fourth connection portion rotatably connected to another side of the second slide and another end portion of the second outer frame.

12. The display device of claim 11, wherein the first motor and the fourth motor are configured to provide a same rotational force to the first guide shaft and the second guide shaft, respectively.

13. The display device of claim 11, wherein the first motor and the fourth motor are configured to provide different rotational forces to the first guide shaft and the second guide shaft, respectively.

14. The display device of claim 1, wherein the display device is configured to move between an expanded configuration and a contracted configuration in which the first outer frame, the intermediate frame, and the second outer frame contact each other and form a planar surface, and
wherein the intermediate frame is stationary as the display devices moves between the expanded configuration and the contracted configuration.

15. A display device comprising:
a display panel comprising a first expansion portion, a second expansion portion, and a center portion between the first expansion portion and the second expansion portion;
a first outer frame connected to the first expansion portion of the display panel, wherein the first expansion portion of the display panel wraps around at least a portion of an outer side portion of the first outer frame;
a second outer frame connected to the second expansion portion of the display panel, wherein the second expansion portion of the display panel wraps around at least a portion of an outer side portion of the second outer frame;
an intermediate frame between the first outer frame and the second outer frame, and overlapping the center portion of the display panel;
a first guide shaft and a second guide shaft on the intermediate frame;
a first motor connected to the first guide shaft and the second guide shaft through at least one gear;
a first slide connected to the first guide shaft and configured to move along the first guide shaft;
a second slide connected to the second guide shaft and configured to move along the second guide shaft;
a first connection portion rotatably connected to one side of the first slide and one end portion of the first outer frame;
a second connection portion rotatably connected to another side of the first slide and one end portion of the second outer frame;
a third connection portion rotatably connected to one side of the second slide and another end portion of the first outer frame; and
a fourth connection portion rotatably connected to another side of the second slide and another end portion of the second outer frame,
wherein the first connection portion is connected only to the first slide and the first outer frame.

16. The display device of claim 15, wherein the at least one gear comprises:
a first gear connected to the first motor; and
a second gear meshed with the first gear and axially coupled to the first guide shaft and the second guide shaft.

17. The display device of claim 15, further comprising a first screw thread at an outer circumferential surface of the first guide shaft, and a second screw thread at an outer circumferential surface of the second guide shaft.

18. The display device of claim 17, further comprising:
a third screw thread at an inner wall of a hole of the first slide surrounding a portion of the outer circumferential surface of the first guide shaft; and
a fourth screw thread at an inner wall of a hole of the second slide surrounding a portion of the outer circumferential surface of the second guide shaft.

19. The display device of claim 15, wherein the first motor and the at least one gear are on the intermediate frame.

20. The display device of claim 15, further comprising:
a first roller at a first housing defined in part by the first outer frame, and connected to the first expansion portion of the display panel; and
a second roller at a second housing defined in part by the second outer frame, and connected to the second expansion portion of the display panel.

21. The display device of claim 20, further comprising at least one of a second motor connected to the first roller, or a third motor connected to the second roller.

* * * * *